United States Patent
Wieser

(10) Patent No.: US 9,924,078 B2
(45) Date of Patent: Mar. 20, 2018

(54) IMAGE-CAPTURING DEVICE, IN PARTICULAR PERSON-COUNTING MECHANISM, HAVING A HOUSING WHICH IS TRANSPARENT IN THE INFRARED RANGE AND NONTRANSPARENT IN THE OPTICALLY VISIBLE RANGE

(75) Inventor: Dieter Wieser, Küsnacht (CH)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1015 days.

(21) Appl. No.: 14/342,426

(22) PCT Filed: Sep. 30, 2011

(86) PCT No.: PCT/EP2011/067195
§ 371 (c)(1),
(2), (4) Date: Mar. 28, 2014

(87) PCT Pub. No.: WO2013/029692
PCT Pub. Date: Mar. 7, 2013

(65) Prior Publication Data
US 2015/0029320 A1    Jan. 29, 2015

(30) Foreign Application Priority Data
Sep. 1, 2011   (EP) .................................... 11179781

(51) Int. Cl.
H04N 5/33      (2006.01)
H04N 7/18      (2006.01)
(Continued)

(52) U.S. Cl.
CPC ....... H04N 5/2252 (2013.01); G06K 7/10366 (2013.01); G08B 13/24 (2013.01);
(Continued)

(58) Field of Classification Search
CPC .... G08B 29/183; G08B 17/12; G08B 19/005; G08B 17/125; G08B 17/10; G08B 25/002;
(Continued)

(56) References Cited

U.S. PATENT DOCUMENTS

| 4,271,358 A | 6/1981 | Schwarz |
| 2009/0020703 A1 | 1/2009 | Buckley et al. |

(Continued)

FOREIGN PATENT DOCUMENTS

| EP | 0435007 A2 | 7/1991 |
| GB | 2475416 A | 5/2011 |
| WO | 2009011860 A1 | 1/2009 |

*Primary Examiner* — Obafemi Sosanya
(74) *Attorney, Agent, or Firm* — Laurence Greenberg; Werner Stemer; Ralph Locher

(57) ABSTRACT

An image-capturing device contains a housing and a camera accommodated in the housing in particular for continuous image capturing and the generation of corresponding image data. Accordingly, the camera is a thermal-imaging camera for capturing thermal images. At least one part of the housing lying in the field of view of the thermal-imaging camera or a part of the housing embodied as an optical lens is constructed such that the part is at least substantially transparent in the infrared range and nontransparent, in particular opaque, in the optically visible range. According to one particular embodiment, the image-capturing device is configured as a person-counting mechanism.

18 Claims, 3 Drawing Sheets

(51) Int. Cl.
  *G08B 13/24* (2006.01)
  *H04N 5/225* (2006.01)
  *G06K 7/10* (2006.01)

(52) U.S. Cl.
  CPC ....... *G08B 13/248* (2013.01); *G08B 13/2491* (2013.01); *H04N 5/33* (2013.01); *H04N 7/18* (2013.01)

(58) Field of Classification Search
  CPC .................. G08B 13/19682; A62C 37/40; G06K 9/6202; H04N 5/2252; H04N 5/33
  See application file for complete search history.

(56) References Cited

U.S. PATENT DOCUMENTS

| | | | | |
|---|---|---|---|---|
| 2010/0200751 | A1* | 8/2010 | Zahn | G01J 5/522 250/330 |
| 2011/0155397 | A1* | 6/2011 | Icove | G01K 11/006 169/43 |
| 2011/0298751 | A1* | 12/2011 | Merel | G02F 1/133308 345/175 |
| 2012/0281083 | A1* | 11/2012 | Chivers | G03B 17/02 348/81 |

\* cited by examiner

IMAGE-CAPTURING DEVICE, IN PARTICULAR PERSON-COUNTING MECHANISM, HAVING A HOUSING WHICH IS TRANSPARENT IN THE INFRARED RANGE AND NONTRANSPARENT IN THE OPTICALLY VISIBLE RANGE

Image-capturing device, in particular person-counting mechanism, having a housing which is transparent in the infrared range and nontransparent in the optically visible range

BACKGROUND OF THE INVENTION

Field of the Invention

The invention relates to an image-capturing device comprising housing and a thermal-imaging camera accommodated in the housing in particular for the continuous capturing of thermal images and for the generation of corresponding image data.

The invention also relates to an image-capturing device configured as a person-counting mechanism and a hazard alarm with an image-capturing device of this kind.

Finally, the invention relates to a system comprising a plurality of image-capturing devices of this kind and a higher-ranking control center.

Many devices and systems are known which are configured to take images and videos of people and to output them to appropriate output devices, such as, for example, to a monitor for surveillance purposes. Further known devices and systems are also configured to evaluate the image or video data output by a camera in order, for example, to determine the number of people within an optical capturing area continuously. Mechanisms of this kind are also called person-counting mechanisms.

Said devices and systems have the drawback that image capturing is not tolerated or is unlawful in many application environments, such as, for example, in hotels, in order to protect individual privacy.

"Protection of individual privacy" or "privacy" means in particular the protection of a person from technical or personal measures that enable conclusions to be drawn regarding the true identity of a person. Measures of this kind are, for example, the evaluation of images or videos from image and video data which are captured and output by a conventional camera. For example, it is possible to determine the identity of a person automatically by means of image comparison based on complex image algorithms.

A further drawback of the known devices and systems is that the mere presence of a camera or of a glass dome with a camera arranged therebehind is sufficient to establish a perceived invasion of a person's privacy.

BRIEF SUMMARY OF THE INVENTION

On the basis of the above, it is an object of the invention to disclose an image-capturing device which avoids the aforementioned problems. It is in particular an object of the present invention to disclose an image-capturing device which enables image and video surveillance while simultaneously preserving the privacy of an observed person.

It is a further object of the invention to disclose a person-counting mechanism, a hazard alarm and a corresponding system.

The object of the invention is achieved by the subject matter of the independent claims. Advantageous embodiments of the present invention are disclosed in the dependent claims.

According to the invention, the camera is a thermal-imaging camera for capturing thermal images. At least one part of the housing lying in a field of view of the thermal-imaging camera or a part of the housing embodied as an optical lens is constructed such that said part is at least substantially transparent in the infrared range and nontransparent, in particular opaque, in the optically visible range.

Here, infrared range in particular means the wavelength range from 3 µm to 50 µm which, according to DIN 5031, is also known as the mid-infrared range, abbreviated as MIR.

The particular advantage of the present invention is that, seen purely from the exterior, an image-capturing mechanism of this kind will not be perceived as unpleasant or as a threat by an observed person, since no transparent, in particular crystal-clear camera optics can be identified. Instead, the observed person perceives the housing parts as optically white or at least opaquely white or even opaquely colored, such as, for example, opaquely grey, red, blue, etc.

A further advantage is that for purely technical reasons, due to the absence of the optically visible range, which is not, or cannot be, evaluated by humans, it is not possible to identify a person, or at least not possible to identify a person reliably. In other words, it is virtually impossible for surveillance staff to identify a person reliably by evaluating images or videos from captured thermal images. The same applies to the identification of the people by computer-assisted image processing of the thermal images. Here, the influences of physical well-being and stress condition of a person and the influences of the ambient temperature are simply too dominant.

In addition, it is possible to select the resolving power of the thermal-imaging camera such that a person is captured when the image-capturing device is mounted correctly, in particular on the ceiling, with a maximum resolution in the range of from 1 to 20 cm, in particular in a range of from 5 to 10 cm. A coarse grid of this kind does not, in principle, permit any useful conclusions regarding the identity of a person.

According to one embodiment, the housing part is made of a material, which is substantially transparent to infrared light, in particular in a wavelength range of from 7.5 µm to 20 µm. A material of this kind can, for example, be a plastic, a glass or a ceramic.

According to one particular embodiment, the material is a transparent plastic, in particular a polymer, into which diffusing particles have been introduced. Here, in particular the volume content and the size distribution of the diffusing particles are determined such that the diffusing particles diffuse the visible light and to a large extent allow the infrared light to pass through. Preferably, the size distribution of the diffusing particles lies in the range of the wavelength of infrared light, which means in the range of from 7.5 µm to 20 µm.

A housing of this kind or a housing area of this kind can, for example, be made of polyethylene into which UV-stabilized $TiO_2$ or ZnO particles have been introduced. Other suitable particles are known, such as, for example, industrial diamonds.

Alternatively or additionally, at least one part of the surface of the housing in the field of view of the thermal-imaging camera or the part of the housing embodied as an optical lens can be structured such that it diffuses the visible light and to a large extent allows the infrared light to pass through. The structuring preferably has structural widths in the range of the wavelength of infrared light, i.e. structural widths in the range of from 7.5 µm to 20 µm. The structures can, for example, be dots or lines. Structuring of this kind can, for example, be achieved by etching, extremely fine brushing or electron polishing of the lens surface or housing part surface.

According to a preferred embodiment, the thermal-imaging camera comprises a thermopile thermal-imaging sensor or a microbolometer thermal-imaging sensor. A thermopile thermal-imaging sensor or also thermopile array can have a resolution of 32×31 pixels, 64×62 pixels or an even higher resolution. Thermopile arrays of this kind can, for example, be obtained from the company Heimann Sensor GmbH in Germany.

Alternatively, the infrared camera can be a bolometer array with the same, similar or higher resolution. Microbolometer arrays of this kind, can for example, be obtained from the company FLIR Systems in the USA.

The advantage of both technological variants consists in the fact that the integrated components do not need to be cooled. The thermal detection range is typically in the range of from about 7.5 µm to 15 µm.

According to one embodiment, the image-capturing device is configured to output the image data generated by the thermal-imaging camera to a cabled and/or radio-controlled data interface of the image-capturing device.

The cabled data interface can, for example, be a connection socket for connection to a bus system. The bus system can, for example, be a field bus, a CAN bus or a LAN bus. The bus system can simultaneously also be used to supply electricity to the image-capturing mechanism.

The radio-controlled data interface can, for example, be a WLAN radio data interface.

According to a further embodiment, the image-capturing device comprises an electronic processing unit connected to the thermal-imaging camera by means of data technology. The latter can be configured to detect a fire in the field of view of the thermal-imaging camera in the sense of a flame alarm based on a first image-processing method. The electronic processing unit is preferably a processor-based processing unit such as, for example, a microcontroller. The program to be executed on the processing unit can be configured such that certain significant flicker frequencies of open fire can be detected.

The image-capturing device can also comprise a separate detection unit arranged in the housing to detect fire-, smoke- or combustion-gas particles. Detection units of this kind can, for example, be an optical measuring chamber based on the diffusion principle, a gas sensor or an acousto-optical measuring chamber.

In particular, the image-capturing device then comprises an electronic processing unit connected to the detection unit by means of signaling or data technology which is configured to determine a detection value and/or a measured value derived therefrom as a measure of the concentration of detected fire-, smoke- or combustion-gas particles and/or an alarm or warning signal derived therefrom.

The object of the invention is also achieved by an image-capturing device configured as a person-counting mechanism. In particular, this person-counting mechanism is a static person-counting mechanism, which is in principle able to detect all the people present in the capture area. Here, static means that it does not count the times an imaginary line or zone is crossed and then determine the total number of people by addition. On the contrary, static means that at every moment the current number of people can be determined—regardless of the "previous history". Preferably, in this case, the thermal-imaging camera comprises a thermopile thermal-imaging sensor or a microbolometer thermal-imaging sensor. The physical properties of the latter mean they are able to detect not only dynamic changes to the warm object, as is the case with a pyroelectric motion detector, but also static temperature differences.

The image-capturing device also comprises an electronic processing unit connected to the thermal-imaging camera by means of data technology which is configured to determine the current number of people in the field of view of the thermal-imaging camera based on an image-processing person-recognition method. To this end, the steps of the image-processing person-recognition method can be depicted in the form of program routines which are executed on the processing unit. In particular, the person-recognition method is embodied to detect—viewed from above—"circular" objects and optionally to identify their further movement, wherein the circular objects are assigned to the heads of people to be captured. The direction of movement and the speed of movement of these "objects" can, for example, be output by means of data technology as a vector together with the determined number of "circular" objects. Outputting the direction of movement and optionally the speed of an object of this kind enables people to be tracked as they go from one optical capture area to an adjacent optical capture area, for example via a higher-ranking control center.

Finally, with this embodiment, the housing of the image-capturing device is also simultaneously the housing of the person-counting mechanism.

The object of the invention is also achieved by a hazard alarm, in particular by a fire alarm, with a detection unit to detect smoke- or combustion-gas particles, wherein the hazard alarm additionally comprises an image-capturing device or thermal image capturing according to the invention and wherein the housing of the image-capturing device is simultaneously the housing of the hazard alarm. A hazard alarm of this kind can also be considered to be a point detector with a thermal-imaging camera or infrared camera.

This enables image and video capturing and simultaneously fire surveillance in the environment of the hazard alarm. Preferably, the hazard alarm comprises a housing with a design known from other fire alarms. A hazard alarm of this kind will not cause people any concerns with respect to the protection of their privacy. The optical appearance as a fire or hazard alarm will even advantageously increase the feeling of safety of the people in question, such as, for example, hotel guests.

According to one embodiment, the hazard alarm comprises an electronic processing unit which is configured to output both the image data generated by the thermal-imaging camera and/or the current number of people determined therefrom and a detection value formed by the detection unit and/or a measured value derived therefrom as a measure of the concentration of detected smoke-, fire- or combustion-gas particles and/or an alarm or warning signal derived therefrom to a cabled and/or radio-controlled data interface of the hazard alarm. The output data can then be evaluated at least indirectly by a computer-aided control center.

In such a case, the data from the thermal-imaging camera and from the detection unit can be transmitted jointly via a fire alarm or signaling bus which is known per se, such as, for example, by means of an OFDM method (OFDM=orthogonal frequency-division multiplexing), by means of an FM modulation method, by means of a PSK method (PSK=phase shift keying) for the modulation of digital data or by means of a differential PSK method. Preferably, the entire electricity supply takes place via a fire alarm bus of this kind.

Alternatively or additionally, the data transmission can also take place by radio, such as, for example, via a WLAN. The data sent can then be evaluated at least indirectly by a computer-aided control center.

Finally, the object of the invention is achieved by a system comprising a plurality of image-capturing devices according to the invention and a control center connected to the image-capturing devices by means of data technology for higher-ranking capturing of the image data and/or the respective current number of people determined by the respective image-capturing devices. The image-capturing devices can, for example, be connected to the control center via a data bus or signaling bus.

According to one embodiment of the system, it additionally comprises a plurality of hazard alarms according to the invention and optionally conventional fire alarms and a hazard alarm control center connected to the hazard alarms by means of data technology for higher-ranking capturing of the detection value transmitted by the respective hazard alarms and/or the alarm or warning signal derived therefrom.

Preferably, the higher-ranking control center and the hazard alarm control center form a joint control center, such as, for example, a control computer.

BRIEF DESCRIPTION OF THE SEVERAL VIEWS OF THE DRAWING

The invention and advantageous embodiments of the present invention are explained using the example of the following figures, which show.

DESCRIPTION OF THE INVENTION

Figure 1:
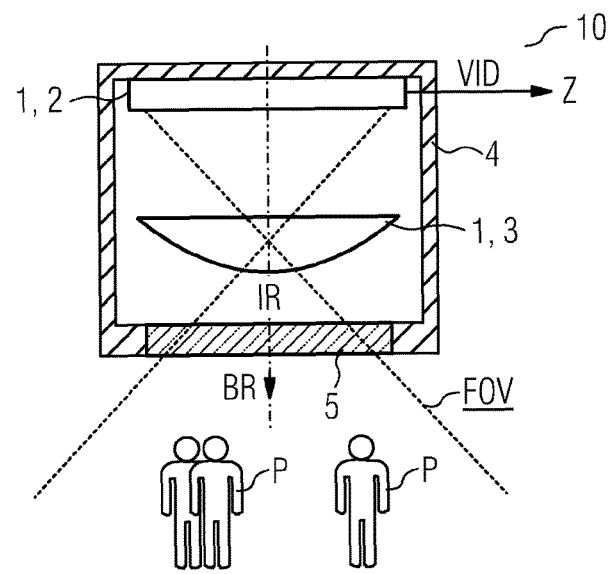
FIG. 1 the basic design of a thermal-image capturing device according to the invention, FIG. 2 a first exemplary embodiment of the thermal-image capturing device with a thermal-imaging camera accommodated in the housing as a unit, FIG. 3 a second exemplary embodiment with a part of the housing embodied as an optical lens, FIG. 4 a third exemplary embodiment additionally configured for flame detection, FIG. 5 a perspective view of a thermal-image capturing device with a housing in the form of a conventional fire alarm according to a further embodiment, FIG. 6 a perspective view of a thermal-image capturing device according to FIG. 5 accommodating an additional detection unit, FIG. 7 an example of a system comprising a plurality of thermal-image capturing devices according to the invention and a control center according to the invention and FIG. 8 an example of a system comprising a plurality of thermal-image capturing devices according to the invention and a hazard alarm according to the invention

FIG. 1 shows the basic design of a thermal-image capturing device 10 according to the invention. Reference symbol 4 designates a housing surrounding the internal parts of the thermal-image capturing device 10 apart from an entrance window 5. In the present example, the optical entrance window 5 is a separate part of the housing. The housing 4 can also be embodied as one part or as several parts. It is preferably made of a plastic, in particular of a light-proof plastic, for example, of black or white plastic. A thermal-imaging camera 1 accommodated in the housing 4 comprises a thermal-imaging sensor 2 and an upstream optical lens 3 which focuses an optical image of objects located in a field of view or optical capture area FOV of the thermal-imaging camera 1 on the thermal-imaging sensor 2, such as, for example, the three people P depicted in the optical capture area FOV of the thermal-imaging camera 1.

The thermal-imaging sensor 2 is preferably a thermopile array or a microbolometer array. The optical lens 3 is made of a material which is optically transparent to infrared light, in particular in a wavelength range of from 3 to 50 µm, preferably in the range of from 7.5 µm to 20 µm. The lens 3 can, for example, be made of sapphire or germanium. For a wavelength range of from 1 to 2 µm, the thermal-imaging sensor can also be a silicon sensor. For the wavelength range of from 3 to 5 µm, it can be an indium-gallium-arsenide sensor or lead-sulfide sensor. For a wavelength range of from 1 to 5 µm, it can also be an indium-antimony detector or cadmium-mercury-telluride detector. Finally, for the wavelength range of from 8 to 14 µm, it can also be a gallium-arsenide-quantum-well detector.

Furthermore, the reference symbol IR designates infrared light, which enters the interior of the housing from outside through the entrance window 5. Finally, BR designates the direction of view or the main optical axis of the thermal-imaging camera 1. It is additionally noted that the thermal-imaging camera 1 can obviously also be swivel-mounted, for example, swivel-mounted with motorized remote control, in the housing 4. The direction of view BR and the field of view FOV of the thermal-imaging camera 1 change correspondingly.

VID designates the image data generated and output by the thermal-imaging camera 1, in particular by the thermal-imaging sensor 2. The thermal-imaging camera 1 preferably comprises an electronic processing unit (not shown in any more detail), such as, for example, a video controller, which processes the sensor data output by the thermal-imaging sensor 2, optionally compresses it by means of data technology and converts it into a corresponding image or video data format for the transmission of the image data VID, such as, for example, into an image-based JPEG format or into a video-based MPEG format. The image data VID can then, for example, be output to a cabled video interface, such as, for example, to a firewire interface. Alternatively or additionally, it can be output by radio, such as, for example, via a WLAN.

According to the invention, in addition, at least one part 5 of the housing 4 lying in a field of view FOV of the thermal-imaging camera 1 is constructed such that it is at least substantially transparent in the infrared range and nontransparent, in particular opaque, in the optically visible range. In the case of a swivel-mounted thermal-imaging camera 1, the at least one part of the housing 5 should have correspondingly larger dimensions. The material of the at least one housing part 5 can, for example, be a transparent plastic, in particular a polymer in which diffusing particles have been introduced or which has a structure which diffuses visible light and to a large extent allows infrared light to pass through. "Optical light" means the light wavelength range optically perceivable to humans of about 380 nm to 780 nm.

Figure 2:
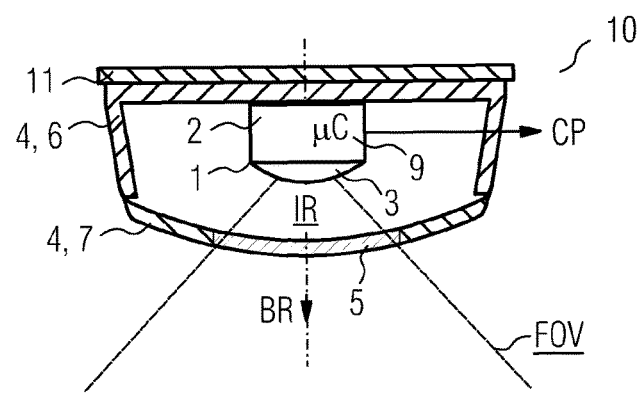

FIG. 2 shows a first exemplary embodiment of the thermal-image capturing device 10 with a thermal-imaging camera 1 accommodated in the housing 4 as a unit. In the present example, the shape of the unit's housing is based on that of a fire or smoke alarm or hazard alarm implemented as a point detector. These known designs do not arouse any suspicion in an observer. Instead, these designs cause an observer to experience an increased positive feeling of safety since it is evident that the area in which the observer is located is under surveillance for fire and smoke.

Reference symbol 11 designates an alarm socket to which the housing 4 of the unit can be attached in a detachable manner. 6 designates a base body of the housing 4 and 7 a lid or a cap of the housing 4. The latter, can, for example, be plugged onto the base body 6.

Reference symbol 9 designates an electronic processing unit, such as, for example, a microcontroller. In the present example, the thermal-imaging sensor 2, the optical lens 3 and the electronic processing unit 9 form a unit.

The microcontroller 9 is also configured continuously to determine and output the current number CP of people P present in the field of view FOV of the thermal-imaging camera 1 by means of an image-processing person-recognition method executed on the microcontroller 9, with which, for example, by means of pattern matching, the number of circular objects, which represent "heads from above", are counted.

Figure 3:
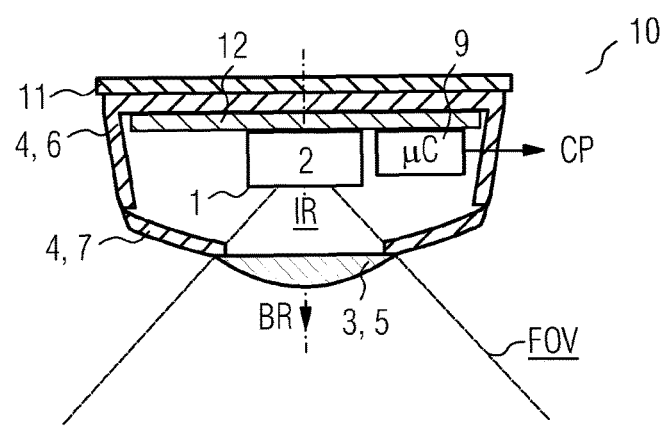

Hence, the device shown in FIG. 2 and also in the subsequent FIG. 3 can also be considered to be a person-counting mechanism.

FIG. 3 shows a second exemplary embodiment with a housing part 5 embodied as an optical lens 3. In this case, for example, the electronic processing unit 9 and the thermal-imaging sensor 2 can be arranged on a circuit carrier 12, while the optical lens 3 embodied as a housing part 5 is accommodated in a lid 7 with a central opening.

Figure 4:
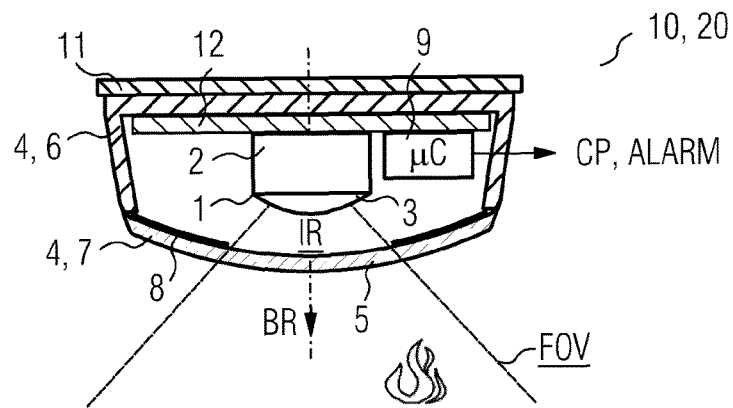

FIG. 4 shows a third exemplary embodiment additionally configured for flame detection. The image-capturing device 10 shown comprises an electronic processing unit 9 connected to the thermal-imaging camera 1 by means of data technology, which is configured to detect a fire in the field of view FOV of the thermal-imaging camera 1 in the sense of a flame alarm based on a flame-detecting image-processing method. A device of this kind can therefore also be described as a hazard alarm 20 with integrated thermal image capturing or as a flame alarm. In the case of flame detection, it is then possible for a fire ALARM to be output by means of the processing unit 9, for example, to a fire-alarm control center connected thereto by means of signaling or data technology.

In addition, the whole lid 7 is made, for example, of a material, which is at least substantially transparent in the infrared range and nontransparent, in particular opaque, in the optically visible range. To delimit the field of view FOV and to screen other components in the interior of the housing, it is possible to attach, for example by gluing, for example a light-proof film in the sense of a pinhole diaphragm to the inner side of the lid 7.

Figure 5:
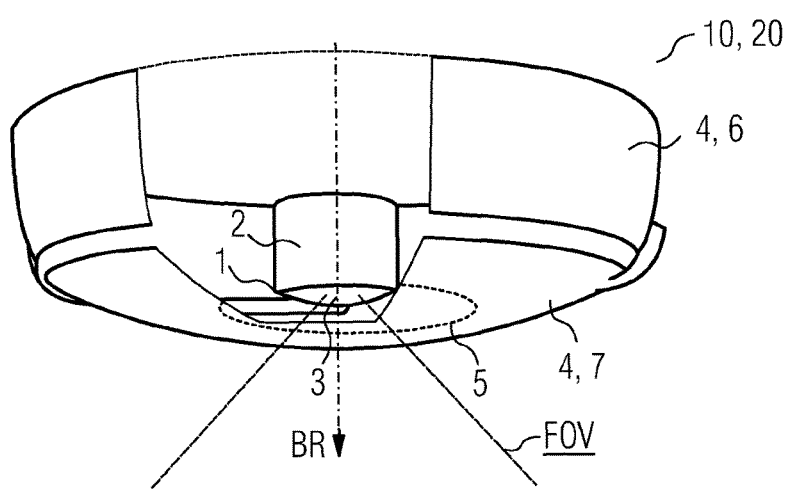

FIG. 5 shows a perspective view of a thermal-image capturing device 10 with a housing 4 embodied as a conventional fire alarm according to a further embodiment. In this case, the thermal-imaging camera 1 is arranged centrally in the housing 4.

Figure 6:
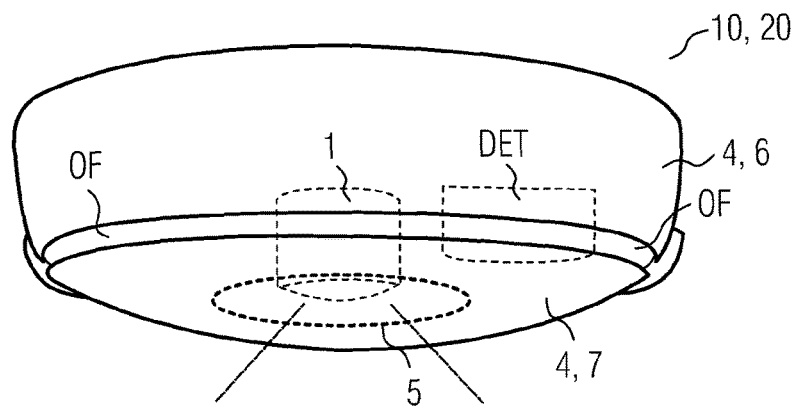

FIG. 6 shows a perspective view of a thermal-image capturing device 10 according to FIG. 5 with an additionally accommodated detection unit DET. In this case, the thermal-imaging camera 1 is once again arranged centrally in the housing 4. In addition, a separate detection unit DET is accommodated in the interior of the housing 4 to detect fire-, smoke- or combustion-gas particles. OF designates opening or slots in the housing 4 through which the fire-, smoke- or combustion-gas particles to be detected can enter the interior to reach the detection unit DET. The detection unit DET is connected by means of signaling or data technology to the electronic processing unit 9, which is configured to determine a detection value and a measured value derived therefrom as a measure of the concentration of the detected fire-, smoke- or combustion-gas particles.

In the present example, an alarm signal ALARM is output when the detection value exceeds a prespecified limit value. The alarm signal ALARM can, for example, be output as an acoustic and/or optical signal and/or also forwarded by data or signaling technology to a fire-alarm control center.

Figure 7:
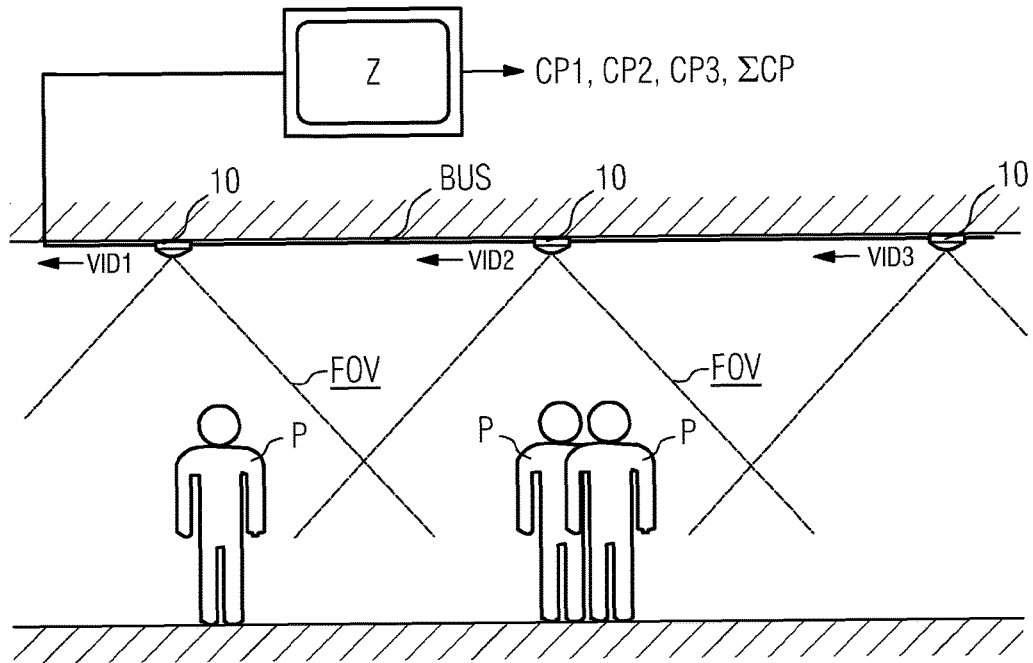

FIG. 7 shows an example of a system comprising a plurality of thermal-image capturing devices according to the invention 10 and a control center Z according to the invention.

The system comprises a plurality of image-capturing devices 10 of which only three are shown in FIG. 7. The image-capturing devices 10 are connected in line to the control center Z via an alarm or data bus BUS by means of data technology. They can, for example, be spaced apart by 5 to 10 m. The control center Z is configured for higher-ranking capture of the image data VID1-VID3 transmitted by the image-capturing devices 10. It also comprises means (not shown in any further detail) for determining in each case a respective number of people CP1-CP3 from the image data VID1-VID3 received and for determining the total number of people ΣCP from these numbers CP1-CP3. The means can, for example, be a person-identification computer program based on image-processing program routines which is executed on a processor-based processing unit in the control center Z. In the present example, the control center Z determines from the image data VID1-VID3 a value 1 for CP1, a value 2 for CP2 and a value 0 for CP3.

Alternatively or additionally, the respective image-capturing devices P can already be configured to determine in each case a value for the number of people CP1, CP2, CP3 and output it to the alarm or data bus BUS. The control center Z can then add up the received numbers of people CP1-CP3 and, for example, visualize them on a monitor, such as, for example, in a floor plan of the building in question.

However, the control center Z can also be configured to display selected, selectable or all image data VID1-VID3 received from the thermal-image capturing devices 10 on a monitor of the control center Z. The image data VID1-VID3 can also be video data so that the thermal image captured by the respective thermal-image capturing device 10 can be displayed in the form of a thermal video. This enables, for example, a member of the surveillance staff to follow the events in the respective optical capture area FOV of the thermal-image capturing devices 10 continuously. If, for example, the thermal-image capturing devices 10 are arranged distributed between different rooms of a hospital, the surveillance staff can also identify at night whether a person is in bed or not or has fallen out of bed, for example. Obviously, surveillance of this kind can also be performed automatically by means of suitable surveillance software.

A system of this kind is generally suitable for checking different areas for the presence of heat sources of all types. This could also include the unauthorized entry of people into a building or the like.

Figure 8:
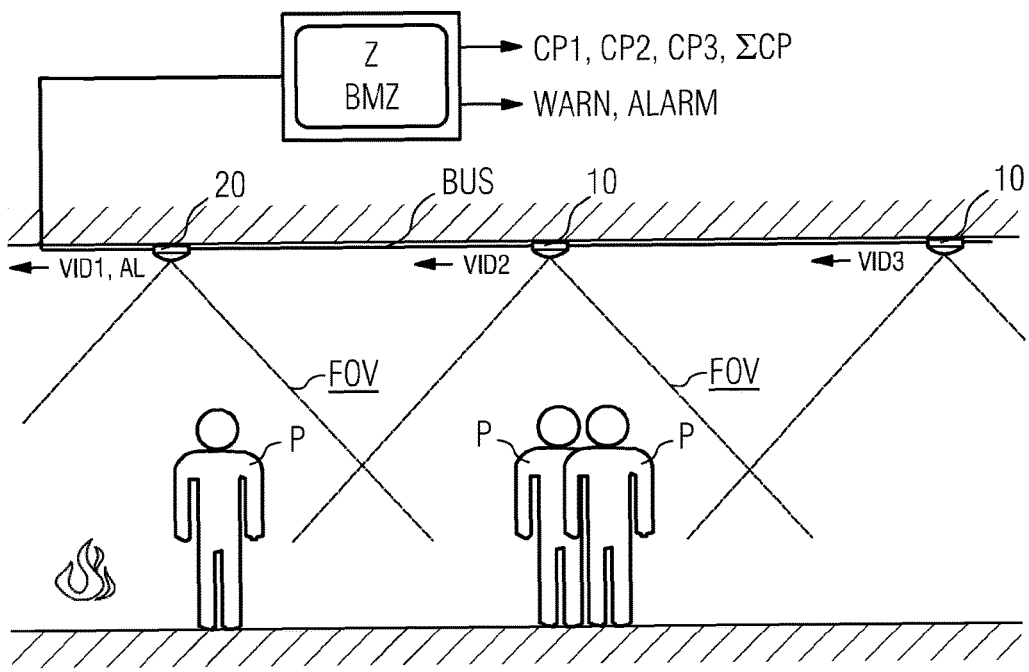

FIG. 8 shows an example of a system comprising a plurality of thermal-image capturing devices 10 according to the invention and a hazard alarm 20 according to the invention. In comparison to the previous FIG. 7, the system now additionally comprises a hazard alarm 20 according to the invention. It is generally possible for a plurality of hazard alarms 20 of this kind to be connected to the signaling bus BUS depicted. In the present example, the control center Z depicted is simultaneously also a hazard alarm control center BMZ for the higher-ranking evaluation of the detection values AL received from the hazard alarms and/or the alarm or warning signals ALARM, WARN derived therefrom.

The left part of FIG. 8 shows a hazard alarm 20 according to the invention, which detects a fire by means of the detection unit DET integrated in the hazard alarm 20 and outputs a corresponding alarm level AL to the signaling bus BUS. The hazard alarm 20 can also be embodied as a flame alarm, wherein, in this case, the thermal-imaging camera 1 in the hazard alarm 20 is configured for flame detection.

LIST OF REFERENCE SYMBOLS

1 Thermal-imaging camera, infrared camera
2 Thermal-imaging sensor, thermopile array, microbolometer array
3 Optical lens, optically active component
4 Housing
5 Housing part, entrance window
6 Base body
7 Lid, cover, cap
8 Diaphragm, pinhole diaphragm, antiglare film
9 Processing unit, microcontroller
10 Image capturing device, person-counting mechanism, point detector
11 Base
12 Circuit carrier, printed circuit board
20 Hazard alarm with integrated thermal image capturing
AL Detection value, alarm level
ALARM Alarm signal, fire alarm
BMZ Fire-alarm control center
BR Direction of view, optical axis
BUS Information bus, data bus, signaling bus, fire-alarm bus
CP, Number of people CP1-CP3
DET Detector, smoke detector, fire detector, gas detector
FOV Field of view
IR Infrared light
OF Housing opening
P Person
ΣCP Total number of people
VID, Image data, video data VID1-VID3
WARN Warning signal
Z Control center, control center with image evaluating unit

The invention claimed is:

1. An image-capturing device, comprising:
a housing having at least one part;
a camera accommodated in said housing for continuous image capturing and a generation of corresponding image data, said camera is a thermal-imaging camera for capturing thermal images;
said at least one part of said housing one of lying in a field of view of said thermal-imaging camera or is embodied as an optical lens and constructed at least substantially transparent in an infrared range and nontransparent in an optically visible range; and
said thermal imaging camera containing a sensor selected from the group consisting of a thermopile thermal-imaging sensor and a micro bolometer thermal-imaging sensor with a resolving power such that a person is captured when the image-capturing device is mounted correctly on a ceiling, and said sensor having a maximum resolution in a range of from 1 to 20 cm.

2. The image capturing device according to claim 1, wherein said housing having a remaining part being substantially light-proof.

3. The image capturing device according to claim 1, wherein said at least one part of said housing being made of a material which is substantially transparent to infrared light.

4. The image-capturing device according to claim 3, wherein said material is a transparent plastic into which diffusing particles have been introduced, wherein a volume content and a size distribution of said diffusing particles are determined such that said diffusing particles diffuse visible light and to a large extent allow the infrared light to pass through.

5. The image capturing device according to claim 1, wherein said housing having a surface with at least one part of said surface lying in the field of view of said thermal-imaging camera or said at least one part of said housing embodied as said optical lens is structured such that said at least one part of said surface diffuses the visible light and to a large extent allows the infrared light to pass through.

6. The image capturing device according to claim 1, further comprising a data interface selected from the group consisting of a cable controlled data interface, a radio-controlled data interface and a cable and radio-controlled data interface, the image-capturing device is configured to output the image data generated by said thermal-imaging camera to said data interface.

7. The image-capturing device according to claim 1, further comprising an electronic processing unit connected to said thermal-imaging camera by means of data technology, said electronic processing unit is configured to detect a fire in the field of view of said thermal-imaging camera in a sense of a flame alarm based on a flame-detecting image-processing method.

8. The image-capturing device according to claim 1, further comprising:
a separate detection unit disposed in said housing for detection of fire, smoke or combustion-gas particles; and
an electronic processing unit connected to said detection unit by means of signaling or data technology, and said electronic processing unit is configured to determine a detection value and/or a measured value derived therefrom as a measure of a concentration of a detected fire, detected smoke or detected combustion-gas particles and/or an alarm or warning signal derived therefrom.

9. The image capturing device according to claim 1, wherein:
said at least one part is opaque in the optically visible range; and
said maximum resolution of said sensor being in a range of from 5 to 10 cm.

10. The image capturing device according to claim 3, wherein said material of said at least one part of said housing being substantially transparent to infrared light in a wavelength range of from 7.5 μm to 20 μm.

11. The image-capturing device according to claim 3, wherein said material is a polymer.

12. An image-capturing device, comprising:
a person-counting mechanism, containing:
a housing having at least one part;
a camera accommodated in said housing for continuous image capturing and a generation of corresponding image data, said camera is a thermal-imaging camera for capturing thermal images;
said at least one part of said housing one of lying in a field of view of said thermal-imaging camera or is embodied as an optical lens and constructed at least substantially transparent in an infrared range and nontransparent in an optically visible range; and said thermal imaging camera containing a sensor selected from the group consisting of a thermopile thermal-imaging sensor and a micro bolometer thermal-imaging sensor with a resolving power such that a person is captured when the image-capturing device is mounted correctly on a ceiling, and said sensor having a maximum resolution in a range of from 1 to 20 cm; and an electronic processing unit connected to said thermal imaging camera by means of data technology, and determining a current number of people in the field of view of said thermal imaging camera based on an image-processing person-recognition method and a housing of the image-capturing device is simultaneously said housing of said person-counting mechanism.

13. A hazard alarm, comprising:

a detection unit for detecting smoke-particles or combustion gas particles;

an image-capturing device, containing:

a housing having at least one part, said housing of said image-capturing device simultaneously being a housing of the hazard alarm;

a camera accommodated in said housing for continuous image capturing and a generation of corresponding image data, said camera is a thermal-imaging camera for capturing thermal images;

said at least one part of said housing one of lying in a field of view of said thermal-imaging camera or is embodied as an optical lens and constructed at least substantially transparent in an infrared range and nontransparent in an optically visible range; and said thermal imaging camera containing a sensor selected from the group consisting of a thermopile thermal-imaging sensor and a micro bolometer thermal-imaging sensor with a resolving power such that a person is captured when said image-capturing device is mounted correctly on a ceiling, and said sensor having a maximum resolution in a range of from 1 to 20 cm.

14. The hazard alarm according to claim 13, further comprising:

a cabled and/or radio-controlled data interface; and an electronic processing unit configured to output both the image data generated by said thermal-imaging camera and/or a number of people currently determined there from and a detection value formed by said detection unit and/or a measured value derived there from as a measure of a concentration of detected smoke, fire or combustion gas particles and/or an alarm or warning signal derived there from to said cabled and/or radio-controlled data interface.

15. The hazard alarm according to claim 13, wherein the hazard alarm is a fire alarm.

16. A system, comprising:

a plurality of image-capturing devices, each of said image-capturing devices containing:

a housing having at least one part;

a camera accommodated in said housing for continuous image capturing and a generation of corresponding image data, said camera is a thermal-imaging camera for capturing thermal images;

said at least one part of said housing one of lying in a field of view of said thermal-imaging camera or is embodied as an optical lens and constructed at least substantially transparent in an infrared range and nontransparent in an optically visible range; and said thermal imaging camera containing a sensor selected from the group consisting of a thermopile thermal-imaging sensor and a micro bolometer thermal-imaging sensor with a resolving power such that a person is captured when said image-capturing devices are mounted correctly on a ceiling, and said sensor having a maximum resolution in a range of from 1 to 20 cm; and a control center connected to said image-capturing devices by means of data technology for a higher-ranking capturing of the image data transmitted by each of said image-capturing devices and/or each of a current number of people determined.

17. The system according to claim 16, further comprising:

a plurality of hazard alarms each containing a detection unit for detecting smoke-particles or combustion gas particles and one of said image-capturing devices and said housing of said one image-capturing device simultaneously being said housing of said hazard alarm; and a hazard alarm control center connected to said hazard alarms by means of data technology for a higher ranking capturing of a detection value transmitted by each of said hazard alarms and/or an alarm or warning signal derived there from.

18. The system according to claim 17, wherein said control center and said hazard alarm control center form a joint control center.

* * * * *